Sept. 7, 1965  DE WITT M. BROWNSON ETAL  3,204,293
APPARATUS FOR MOLDING HOLLOW TUBULAR ARTICLES
Filed Sept. 27, 1962  2 Sheets-Sheet 1

INVENTORS
DEWITT MARTIN BROWNSON
EUGEN FRANZ POLKA
BY Louis F. Heeb
George W. Reiber
ATTORNEYS

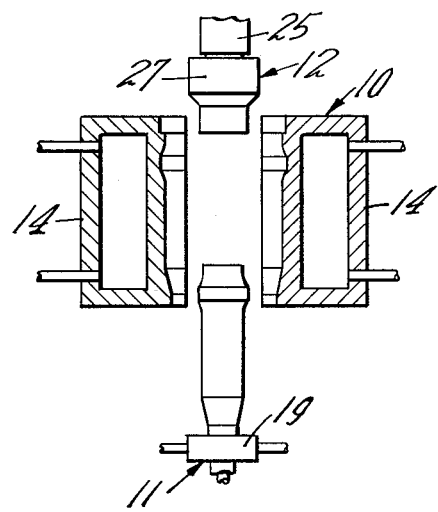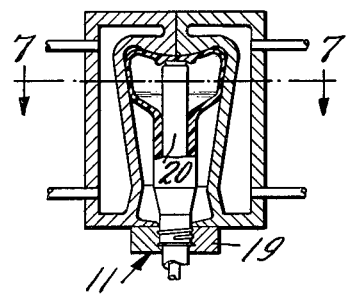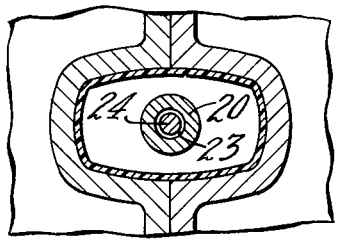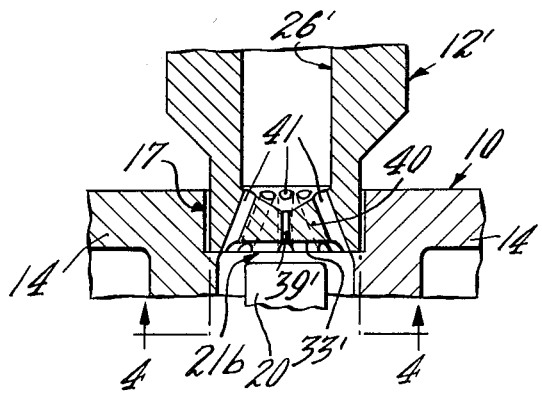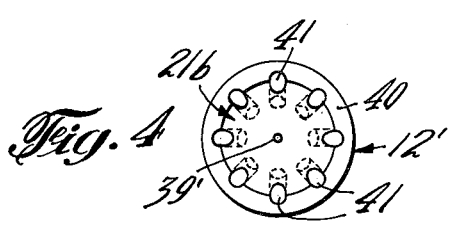

United States Patent Office 3,204,293
Patented Sept. 7, 1965

3,204,293
APPARATUS FOR MOLDING HOLLOW
TUBULAR ARTICLES
De Witt Martin Brownson, West Acton, Mass., and Eugen
Franz Polka, Algonquin, Ill., assignors to American
Can Company, New York, N.Y., a corporation of New
Jersey
Filed Sept. 27, 1962, Ser. No. 226,609
9 Claims. (Cl. 18—30)

This invention relates to molding of hollow tubular articles of thermoplastic material, and particularly to the molding of preforms or parisons used in the manufacture of blown plastic containers and the like.

The developments in the art of blow molding organic plastics have been rapid in recent years. Particular attention is now being given to a preliminary stage in the blow molding operation, that of forming the preform ordinarily referred to as the parison. Two basic techniques are currently practiced in forming the parison. The first is by extrusion, wherein the parison is extruded as a hollow tube either externally of or within the blow mold, pinched off to close one end, and severed from the extruder. The other is by injection molding, wherein the parison is formed under hydrostatic pressure separately of the blow mold in an injection mold, usually around a removable core pin, and transferred to the blow mold while still on the core pin. There is also available in the prior art techniques combining extrusion and injection molding which seek to embody the advantages of each.

Injection molding the parison has several advantages to recommend it over extrusion forming or combined extrusion-injection forming. Among these are greater equipment flexibility, controlled distribution and orientation of plastic in the wall areas resulting in improved strength and versatility in article shape as well as material savings, reduction of stress cracks often encountered in the pinch or weld line of an extruded parison, and the elimination of such problems as neck-down, irregular and premature cooling at one end of the parison, off-center blowing, and non-uniform viscosity and extrusion rates all common to extrusion forming. In addition, injection molding the parison lends itself extremely well to finish forming of the neck area of the article prior to blowing, thereby enabling greater dimensional control of an area which, in the case of containers is ordinarily threaded, and eliminating the need for trimming or reaming a neck opening subsequent to blowing which otherwise often results in the presence of debris within the blown article.

Injection molding a threaded neck parison for the manufacture of blown plastic bottles, for example, is ordinarily done in one of two ways. Either the molten plastic is injected first into the neck area of the parison cavity at the base of the core pin and then flows around the pin to fill the entire cavity, or the mold assembly may be constructed to receive the injected plastic into the cavity at the tip or free end of the core pin. In the latter method, the core pin and neck mold are usually separable from the body mold as a unit and offers the preferred advantages of simpler construction, greater equipment versatility, more convenient differential cooling to set the neck area while maintaining the body area hot and pliable, and a convenient, easily handled carrier for transferring the molded parison to the blowing mold.

The practice of injection molding parisons by the latter method, although having preferred advantages, is not entirely free of difficulty. A principal problem, and one to which the present invention is specifically directed, is that of core pin instability or deflection occurring at the time of injection. This problem occurs due to the high energy stream of molten plastic, ordinarily injected as a small jet at pressures of several hundred atmospheres, impinging on the tip of the core pin as the plastic enters the mold cavity and is particularly severe where the ratio of core pin length to diameter is high. Although the injection cycle is extremely rapid, nevertheless the effect of the kinetic energy transmitted to the core pin by the impinging plastic is to create an unbalanced load on the core pin, causing it to deflect and assume an eccentric position in the mold cavity. Since the injected plastic sets rather rapidly, the core pin does not recenter itself quick enough to ensure uniformity in wall thickness of the molded parison.

Several approaches to a solution to the problem of core pin deflection occur in the prior art. One solution is to keep the core pin deliberately short and its tip sufficiently removed from the injection nozzle so that the impinging plastic has less effect on core pin stability. Obviously, this solution is useful only if the parison itself is to have a short configuration but, even so, results in a parison end wall too thick in proportion to the side wall to ensure uniform distension when blown. Another solution is the use of radial support pins which extend through the mold cavity to support the core pin and which are retracted after injection has taken place. This has been found to produce fissures or slits in the parison wall which frequently fail to heal or reweld themselves sufficiently to ensure a sound wall structure. Another solution is simply to make the wall thickness of the parison a little greater to compensate for the non-uniformity caused by core pin deflection. This, like the first-mentioned solution above, makes for a heavy parison wall which is difficut to blow and is an obvious waste of material.

An object of the present invention, therefore, is to overcome the problems of the prior art.

Another object of this invention is to provide means for injection molding hollow plastic articles having improved wall characteristics.

Another object of this invention is to provide an improved means for injection molding hollow, tubular plastic parisons having improved uniformity in wall section.

Still another object of this invention is to provide means for injection molding hollow plastic parisons for use in blown containers without encountering excessive distortion of the mold surfaces due to the kinetic energy of the injected plastic.

To the accomplishment of these objects, the present invention contemplates for use with the parison mold an injection nozzle specifically constructed to inject under hydrostatic pressure a molten stream of plastic into the mold cavity with a minimum transfer of kinetic energy to the core pin forming the inner surfaces of the cavity. An annular nozzle orifice is provided which, when the nozzle and mold are mated, substantially aligns with the annular space portion of the mold cavity concentrically of the core pin and directs the molten stream axially and annularly into the cavity without impinging with any noticeable force onto the core pin itself.

Numerous other objects and advantages will be understood from the following description, which, taken in connection with the accompanying drawings, discloses a preferred embodiment thereof.

Referring to the drawings:

FIG. 3 is a fragmentary sectional view illustrating a modified form of the present invention.

FIG. 4 is a sectional view taken substantially along lines 4—4 of FIG. 3.

Figures 1, 2:
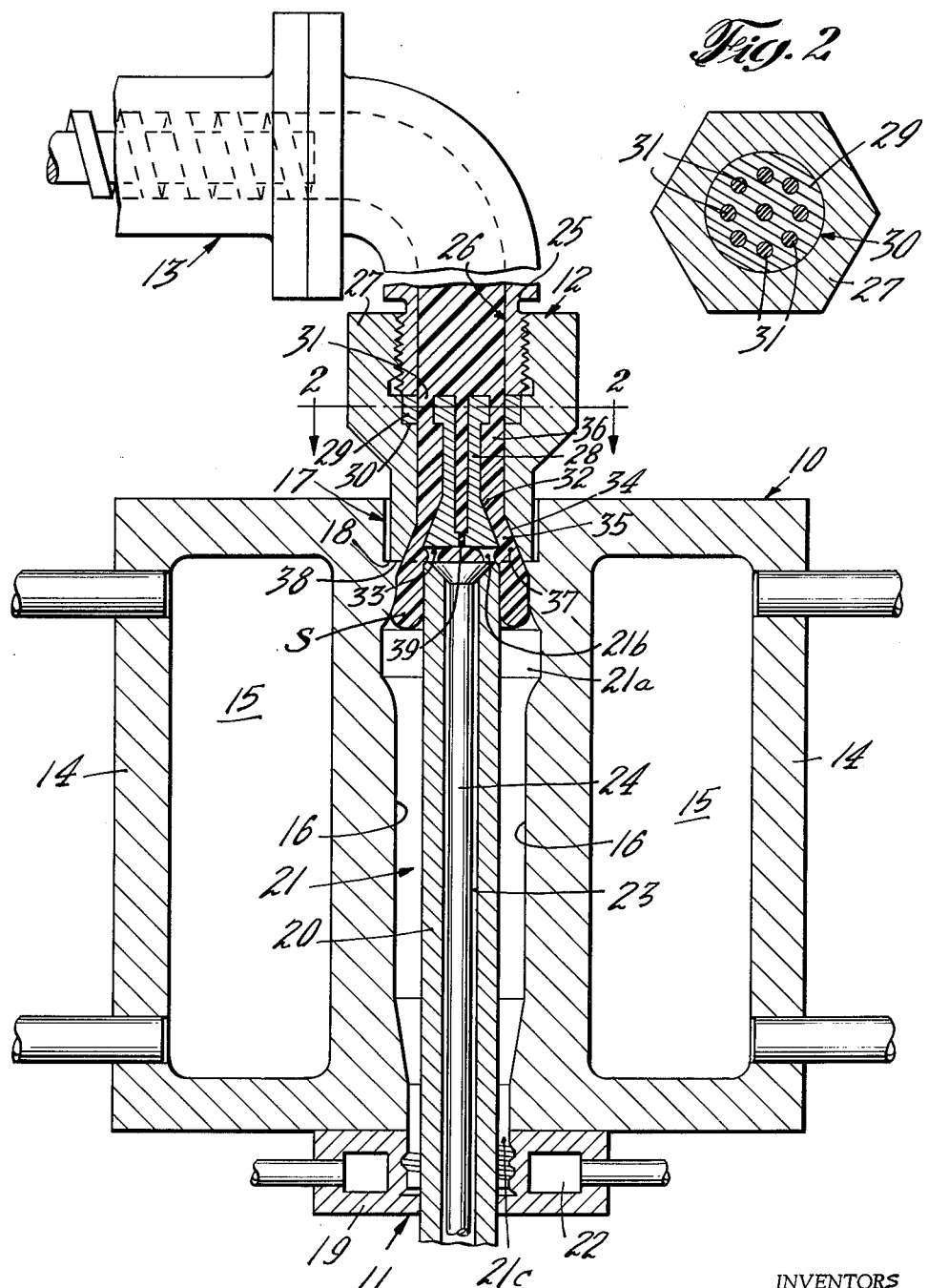
FIG. 1 is an elevational view in section of a preferred form of apparatus embodying the present invention.
FIG. 2 is a sectional view taken substantially along lines 2—2 of FIG. 1.

FIGS. 5 to 7, inclusive, are views in section depicting the removal of the molded parison from the parison mold and the subsequent blowing operation in a conventional blowing mold.

A preferred or exemplary form of the present invention is illustrated in FIG. 1, showing in a typical closed mold relationship the operative elements comprising a body mold generally designated 10, a core-pin neck mold assembly generally designated 11, and an injection nozzle generally designated 12, the latter element being associated and in communication with a conventional plasticizer or feed device generally designated 13 for supplying a thermoplastic material in a molten state.

The body mold 10 may be of any conventional construction and is here shown as comprising a pair of mold sections 14, 14 which are relatively moveable into cooperating engagement along a split line coincident with the longitudinal axis of the nozzle 12. These mold sections are customarily hollowed-out to provide cavities 15, 15 through which a heating medium, such as hot oil, may be circulated to regulate the temperature of the mold. Both mold sections have contoured inner faces 16, 16 which, together, define the outer surface of the parison wall. These faces may be of any desired configuration and, indeed, it is a principal advantage of injection forming that these surfaces may be of varied contour to produce a parison having any desired wall cross section or geometry. The mold sections 14, 14 are recessed at one end to provide a well 17 to receive the nozzle 12, and are provided with an annular shoulder or ledge 18 at the base of the well 17 against which the nozzle seats to close the mold in tight sealing relation.

The core pin-neck mold assembly 11 comprises a neck mold 19 and a core pin 20 mounted perpendicularly to and concentrically of the neck mold. These elements are preferably operable as a unit and are relatively moveable into cooperative relation with body mold 10 from a position opposite the nozzle 12, thus closing the other end of the mold to define a parison mold cavity 21. As shown, cavity 21 comprises a generally cylindrical or annular space 21a defining the main body wall of the parison to be formed, an end space 21b defining the closed end of the parison, and a neck space 21c, which of course, is provided by the neck mold and is usually appropriately contoured to produce male threads on the neck of the parison.

The neck mold itself may be segmented or integral, depending on operating procedure, and is customarily provided with a passage 22 through which a cooling medium may be circulated to facilitate rapid setting or solidification of the neck portion of the parison.

Core pin 20 is adapted to extend substantially the full length of mold sections 14, 14 to define the inner surface of cavity 21, terminating just short of nozzle 12 and defining therewith space 21b. In many instances, it is desirable for the core pin to have a very great length to diameter ratio and it is for this reason that nozzle 12 is constructed to inject the molten plastic in a particular annular pattern, a feature shortly to be more fully described. Where the assembly 11 is to remain intact and serve as a carrier for transferring the molded parison to a blowing mold, such as illustrated in FIGS. 5 and 6, the core pin may also be provided with a center bore 23 and a valve stem 24 for the passage and regulation of gas flow, in which case core pin 20 serves as the blow pin in the subsequent blowing operation.

Nozzle 12 in its preferred form is shown in FIG. 1 and is there illustrated as comprising a body or shank 25 having a central passage 26 communicating with the discharge end of plasticizer 13, a cap 27 threaded to the end of the shank and engageable in well 17 against ledge 18 of body mold 10, and a center core or plug 28 concentrically mounted within cap 27.

Core 28 has an enlarged end in the shape of a flange 29 which seats within an annular recess 30 within cap 27 to support the core centrally of the nozzle axis when the cap is threaded onto shank 25. The flange is provided with a plurality of circumferentially spaced openings 31 disposed in an annular pattern in substantially flush alignment with the surrounding wall of passage 26 so as to form a longitudinally continuous, although circumferentially interrupted, passage extending through the nozzle toward its outlet.

A principal feature of the instant invention resides in the outlet configuration of nozzle 12 and now will be described with particularity. As shown, the free end of core 28 is tapered outwardly to form a diverging wall 32 which extends from a point somewhat less than midway of the core all the way to its tip end, here shown as a substantially flat wall 33. In a like manner, a portion of the inner wall surface of cap 27 is chamfered to form a diverging wall 34, the two tapering walls 32, 34 thereby cooperatively forming a diverging annular passage 35 extending from a generally cylindrical annular passage 36 and terminating at the tip of the nozzle as an annular orifice 37. By the word "annular" is meant not only a perfect circular geometry as illustrated in the drawings but also oval, elliptical and even polygonal configurations, it being understood that the selected geometry of orifice 37 will be dictated somewhat by the cross sectional configuration of the parison to be molded. Indeed, a principal advantage of injection molding parisons, as hereinbefore explained, lies in the ability to shape and control the parison wall geometry to achieve desired wall shape and characteristics.

It will be noted that in the nozzle construction illustrated, the wall 33 forming the tip end of core 28 is withdrawn slightly within the surrounding wall 34 of cap 27. Wall 34 extends beyond the core and terminates in a narrow face 38 which engages against ledge 18 within mold well 17 and forms a smooth, substantially continuous surface with the mold cavity walls 16, 16. In this manner, wall 33 is spaced from the tip end of core pin 20 a sufficient distance to form end space 21b. It will be understood that this spacing will depend on the desired thickness of the end wall of the molded parison, and, although here shown as opposed flat surfaces, both wall 33 and the tip end of the core pin may be appropriately contoured to produce any desired wall therebetween. Ordinarily, this end space 21b is quite narrow to produce a molded wall susceptible of greater control in the blowing mold, and for this reason a small secondary orifice 39 may be provided in face 33 to facilitate complete and uniform fill of space 21b.

The diverging annular nozzle configuration just described has several important advantages, now to be explained. Its principal objective is to prevent deflection of core pin 20 as the high pressure molten plastic enters the mold cavity. To those skilled in the art, it will be appreciated that the injected plastic, under hydrostatic pressures as high as 20,000 p.s.i., literally "explodes" into the mold cavity at great velocity and with extremely high levels of kinetic energy. This is accompanied by an immediate expansion or "swell" of the plastic stream as it emerges from the nozzle orifice, creating turbulence and dynamic forces having indeterminate radial influence. By providing the nozzle 12 with a diverging flow passage 35, the injected plastic stream, here designated S, is given an initial outward component so that it emerges from orifice 37 in a cone-like envelope which enters annular cavity 20 in a direction tending away from but moving concentrically to the core pin. By making the lateral dimensions of wall 33 at least no less than those of core pin 20, it will be seen that stream S can be made to flow into the cavity and around the core pin with very little initial impact on the core pin itself. Thus, the force of the high velocity stream S is deliberately directed away from the core pin and its effect thereon in the form of turbulence and dynamic expansion greatly minimized, its kinetic energy being dissipated essentially in its axial flow into the mold cavity and to some extent against the outer mold walls 16, 16.

Secondary but no less important advantages of the diverging geometry in an injection nozzle are its improved mold sealing characteristic and its reduced tendency to "drool"; i.e. post-injection oozing from the nozzle orifice. Because of the high injection pressure, nozzle 12 must be of high strength construction, including the necked-down portion of cap 27 which seats within well 17 of body mold 10, and must be capable of tightly sealing this end of the mold cavity. By providing divergence in passage 35 which directs the molten plastic outwardly from the smaller central passages 26 and 36, cap 27 may be smaller in diameter than otherwise, have sufficient wall thickness for strength, and yet annular face 38 at the nozzle tip is kept narrow and small in area to ensure maximum sealing pressure against ledge 18 to seal the mold. Likewise, there is less tendency for a nozzle of the type described to continue to "drool" or ooze after the nozzle is retracted at the end of the injection cycle, because the head pressure in passage 26 is less than it would be if the nozzle were constructed with a larger diameter to provide strict axial, instead of divergent, annular flow into mold cavity 20. Too, the diverging passage 35 probably has some restrictive effect to reduce oozing, and, in sum, yields benefits in cleaner and more dependable repeating operation.

Up to this point, nothing has been said of the dimensional characteristics of nozzle 12. Generally, this is a consideration of the specific molding job being performed and, to a limited extent, certain operating conditions. It will be recognized by those skilled in the art that, with certain ranges of injection pressures and viscosities of the plastics used, some difficulty may be experienced in re-forming the molten plastic into a coalesced, continuous stream after it passes through the plural openings 31 and before it leaves orifice 37. In some instances, the several smaller jets of plastic leaving openings 31 fail to reweld themselves satisfactorily and produce a striated pattern in stream S which could result in a parison of imperfect wall structure. In view of this problem, care must be exercised in the dimensions of the two annular passages 35 and 36, as well as the number and space of openings 31.

One but by no means exclusive arrangement which has been found to achieve striation-free injection has been that where the spacing between diverging walls 32 and 34, defining the width of annular passage 35, is about .018 to .020 of an inch and the angle of divergence of the passage is about 20°. These dimensions provide adequate length to passage 36 which, complemented by the restrictive spacing of diverging passage 35, satisfactorily effects rewelding of the plastic into a coalesced, annular stream S as it emerges from the nozzle. Moreover, the angle of divergence is great enough to fulfill the principal objective of avoiding impingement of stream S against the tip of core pin 20, but without greatly increasing the area of nozzle end wall 33 which otherwise, because of its relative temperature with respect to the cooperating tip end of the core pin, might delay the solidification of the plastic in space 21b too long to ensure smooth separation of the parison end wall when the nozzle 12 is retracted from well 17.

FIGS. 3 and 4 illustrate an alternate embodiment of the present invention which is a simpler construction and performs satisfactorily under these operation conditions where the striation problem is less pronounced. Rather than incorporating the separate shank, cap and center core elements of the previous embodiment, there is provided a nozzle 12' which may be of a unitary structure and adapted to be mounted directly to the outlet head of plasticizer 13. This nozzle is provided with a central passage 26' communicable with the outlet of the plasticizer and which terminates in a solid integral wall 40 closing the end of the nozzle, the outer surface 33' of which is recessed within the nozzle tip to define with the tip end of the core pin the end space 21b.

Extending through wall 40 at about 20° divergence are a plurality of circumferentially spaced passages 41, these passages being closely spaced in an annular pattern to open directly over annular mold space 21a. Thus, this embodiment of the invention provides multi-orifice injection annularly and concentrically of core pin 20 but with sufficient divergence of the molten plastic to achieve those same advantages as hereinbefore described. If desired, a small secondary passage 39' may be provided centrally of wall 40, similar to the previously described nozzle 12, to facilitate filling of end space 21b.

It is thought that the invention and many of its attendant advantages will be understood from the foregoing description and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and process hereinbefore described being merely a preferred embodiment thereof.

We claim:
1. Apparatus for molding hollow tubular articles of plastic material comprising a mold shell, a core pin assembly supported concentrically within and enclosing one end of said shell, said shell and said core pin defining an annular space closed at one end, and an injection nozzle communicable with a molten mass of said material under pressure and being relatively moveable into closing engagement with said shell at its opposite end to a position spaced from said core pin to define an end space, said spaces thereby providing a unified cavity for shaping the integral side and end walls of the articles to be molded, said nozzle having a diverging annular flow path opening directly into said annular space and concentrically of said core pin to inject a charge of molten plastic from said mass in a diverging annular pattern into said cavity.

2. The apparatus of claim 1 wherein said flow path is in the form of a continuous annular passage which tapers outwardly from a point within said nozzle and terminates as an annular orifice substantially concentrically aligned with said annular space.

3. The apparatus of claim 1 wherein said flow path is in the form of a plurality of relatively diverging passages disposed in an annular pattern in the end of said nozzle, said passages terminating as a plurality of orifices substantially concentrically aligned with said annular space.

4. The apparatus of claim 1 wherein said flow path has an angle of divergence of approximately 20° and a lateral dimension of between .018 to .020 of an inch.

5. In combination with an injection mold having outer mold sections and a core pin supported at one end concentrically within said sections in cantilever fashion to form a mold cavity, an injection nozzle having a central passage communicable with a source of molten plastic under pressure and a guide portion at one end thereof engageable with said mold sections to close said mold, said nozzle having a centrally disposed end wall corresponding in geometry to the free end of said core pin and adapted to define therewith an end space portion of said cavity when said nozzle and mold are mated, said guide portion having a diverging annular flow path in communication with said central passage and opening around said end wall directly into said cavity concentrically of said core pin to direct a charge of molten plastic in a diverging pattern into said cavity without direct impingement against said core pin.

6. In combination with an injection mold having outer mold sections and a core pin supported at one end concentrically within said sections in cantilever fashion to form a mold cavity, an injection nozzle comprising a tubular member having a central passage communicable with a source of molten plastic under pressure, an annular guide cap secured to the end of said tubular member and adapted to seat against said mold sections to close said mold, said cap having an interior wall concentrically aligned with the center line of said mold and a tapered surface extending outwardly from a point within said nozzle to the tip end of said cap where it seats with said mold, and a center core supported at its inner end concentrically within said nozzle and having annularly spaced openings at its inner end communicating with said central passage in said tubular member, said core being tapered outwardly at its free end in a cone-like enlargement defining with said tapered surface in said cap a diverging annular passage substantially alignable with said cavity concentrically of said core pin, said annular passage terminating in a continuous, annular orifice which opens directly into said cavity surrounding said core pin when said nozzle and mold are mated and being adapted to direct a charge of molten plastic in a diverging stream into said cavity without direct impingement against said core pin.

7. The apparatus of claim 6 wherein the free ends of said core pin and said core are brought into spaced, cooperative relation when said nozzle and mold are mated to form an end space portion of said cavity, the end surface of said core having lateral dimensions no less than the corresponding dimensions of said core pin.

8. In combination with an injection mold having outer mold sections and a core pin supported at one end concentrically within said sections in cantilever fashion to form a mold cavity, an injection nozzle having a central passage communicable with a source of molten plastic under pressure and a guide portion at one end thereof engageable with said mold sections to close said mold, said guide portion having a lateral wall closing said central passage and forming with the free end of said core pin an end space portion of said cavity, said lateral wall having formed therein a plurality of relatively diverging passages disposed in an annular pattern and terminating as a plurality of orifices substantially alignable with said cavity concentrically of said core pin when said nozzle and mold are mated, said passages being adapted to direct a charge of molten plastic in plural diverging streams into said cavity without direct impingement against said core pin.

9. The apparatus of claim 8 wherein the central portion of said lateral wall inwardly of said orifices is recessed slightly within said guide portion, and has lateral dimensions no less than the corresponding dimensions of said core pin.

References Cited by the Examiner

UNITED STATES PATENTS

| 2,262,612 | 11/41 | Kopitke | 18—5 |
| 3,069,722 | 12/62 | Kato | 18—5 |
| 3,080,614 | 3/63 | Adams | 18—55 |
| 3,081,489 | 3/63 | Jackson et al. | 18—5 |
| 3,082,484 | 3/63 | Sherman | 18—55 |
| 3,091,803 | 6/63 | Scott et al. | 18—5 |

WILLIAM J. STEPHENSON, *Primary Examiner.*

MORRIS LIEBMAN, MICHAEL V. BRINDISI,
*Examiners.*